June 25, 1968 MASAO NISHIKAWA ET AL 3,390,396

HIGH-SPEED RECORDING METHOD

Filed Sept. 20, 1966 4 Sheets-Sheet 1

United States Patent Office 3,390,396
Patented June 25, 1968

1

3,390,396
HIGH-SPEED RECORDING METHOD

Masao Nishikawa, Yokohama-shi, and Saburo Yabe, Urawa-shi, Japan, assignors to Hakko Kogyo Kabushiki Kaisha, Tokyo-to, Japan, a joint-stock company of Japan
Filed Sept. 20, 1966, Ser. No. 580,811
1 Claim. (Cl. 346—1)

ABSTRACT OF THE DISCLOSURE

A high-speed recording method which comprises causing two ring counter circuits to operate simultaneously with respective cyclic periods which differ by a suitable very small time interval. The phenomenon to be recorded, such as a sound wave, is projected at the start of the counter circuit of shorter cyclic period. A time gate of a receiver is opened for intercepting the sound wave for a time equal to the small time interval from the start of the period of the counter circuit which completes its cycle with a delay. Reception is carried out successively $n$ times through $n$ cycles each for the small time interval difference after a lag time from the instant of the respective projection of the sound wave thereby to accomplish time selection of $n$ divisions.

This invention relates to techniques in recording arriving sound waves and electromagnetic waves. More particularly, the invention concerns a new method and apparatus for high-speed recording of this nature.

Heretofore, in a common system for recording arriving electromagnetic waves or sound waves such as those for measuring depths and positions of material objects, it has been the practice to maintain an electrode in contact with a recording sheet and cause the electrode to travel over the recording sheet surface at a constant speed, thereby to measure the time interval between each instant of wave projection and instant of arrival of the reflected wave. However, in the case where the scanning speed of the recording pen exceeds a certain speed, the pen becomes incapable of mechanically following the required operation, and recording becomes impossible.

It is an object of the present invention to overcome the above described difficulty by providing a high-speed recording apparatus wherein an electronic selection mechanism and a mechanical rotary mechanism are combined.

Another object of the invention is to provide a high-speed recording method wherein two ring counter circuits are used.

According to the present invention, briefly stated, there is provided a high-speed recording apparatus characterised by the combination of: a recording mechanism for causing a recording pen to traverse at a constant speed; $n$ time-selection circuits provided in a receiving circuit; and a rotary contact mechanism for passing the outputs of the selection circuits in $n$ divisions at specific space intervals between zero and maximum calibrations of a recording scale and introducing the outputs one by one into the recording mechanism, the starting and stopping of the $n$ time-selection circuits is caused to occur in synchronism with the operation of the recording mechanism on the recording scale of $n$ divisions thereby to accomplish time selection of received signal voltages by passing each selected signal voltage through a selection circuit coinciding in operational time with said signal voltage to said recording pen, the recording pen thereby being caused to register on a sheet of recording paper at a specific calibration position.

According to the present invention, in another aspect thereof, there is provided a high-speed recording method which comprises: causing two ring counter circuits to operate simultaneously with respective cyclic periods which differ by a suitable very small time $\Delta t$; projecting a sound wave at the start of each period of the counter circuit of shorter cyclic period; opening a time gate of a receiver for intercepting the sound wave for a time equal to $\Delta t$ from the start of the period of the counter circuit which completes its cycle with a delay; and successively carrying out reception $n$ times through $n$ cycles, each for $\Delta t$ after a lag time of $(n-1)\Delta t$ from the instant of the respective projection of the sound wave thereby to accomplish time selection reception of $n$ divisions.

That is, in the case where recording is to be accomplished with a recording pen by intercepting an arriving electromagnetic wave or sound wave, the apparatus according to the invention operates in the following manner. The arriving sound wave or electromagnetic wave is received by a receiving circuit provided with $n$ gate circuits which successively open at constant time intervals, and a counter circuit is activated by trigger pulses having a constant period to cause the gate circuits to open one by one. In this operation, the projection of the detection pulse is timed to occur simultaneously with the opening of the first gate circuit, and the gate output thus produced is applied to a recording pen through a kind of change-over switching section comprising various selection contacts and common contacts of a rotary drum, whereby a recording is registered on a sheet of recording paper by means of the recording pen which moves with a predetermined relationship to the rotation of the drum.

The recording paper is provided with a recording scale divided into $n$ divisions, over which the recording pen traverses. Then, as the above mentioned gate output and succeeding gate outputs successively come over the scale, the detection pulses are applied as voltages to the pen to activate the same, and each received voltage is registered at a specific calibration position.

The above mentioned drum is provided with a drum synchronously rotating therewith for controlling the power source of the counter circuit and constituting a kind of switching section comprising contact-making contacts and common contacts. The counter circuit is operated by the opening and closing operation of this switching section, and control is accomplished with a time relationship to the movement of the recording pen.

The nature, principle, and details of the invention will be more clearly apparent from the following detailed description with respect to preferred embodiments of the invention when read in conjunction with the accompanying drawings, in which like parts are designated by like reference numerals.

Figure 1:
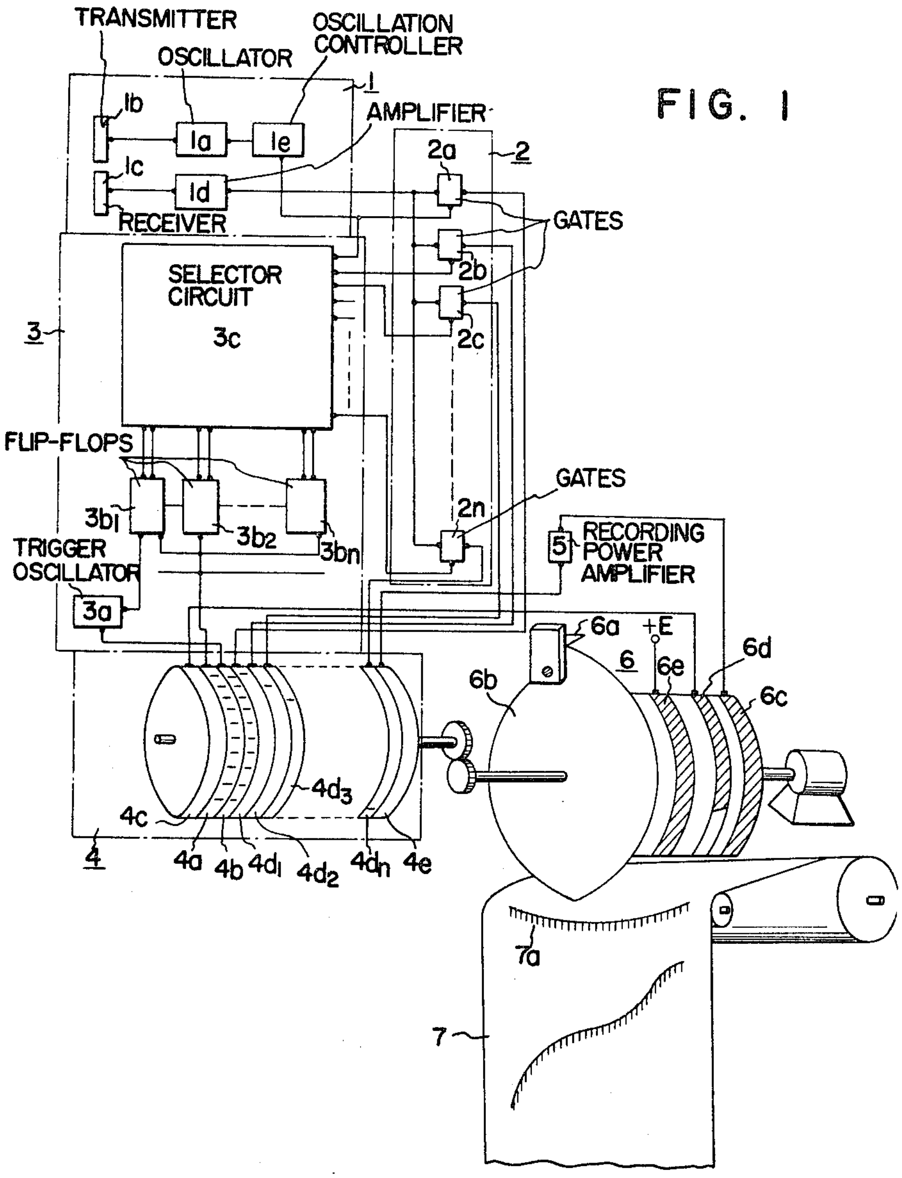
FIG. 1 is a schematic diagram, partly in block diagram form, showing one example of apparatus embodying the invention.
Figure 2:
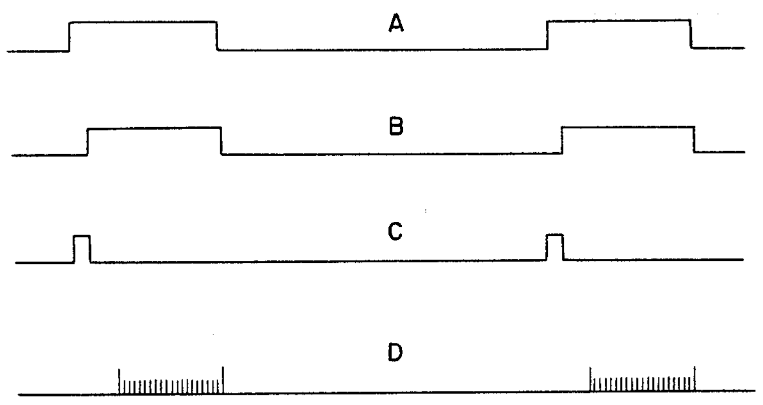
FIG. 2 is a graphical time chart indicating the characteristics of certain parts of the apparatus shown in FIG. 1.

Referring first to FIGS. 1 and 2, the case where the position of an object is detected by sending out sound waves and intercepting the reflected sound waves will be considered.

In FIG. 1 the component enclosed by dot-and-dash line and designated generally by reference numeral 1 is a wave transmitting and receiving circuit in which sound-

2 wave pulses for detection generated by an oscillator 1*a* are transmitted through a wave transmitter 1*b* into the water and then are reflected back after they strike an object in the water. The waves thus reflected are received by a wave receiver 1*c* and amplified by an amplifier 1*d*, the output of which is applied simultaneously to gates 2*a*, 2*b*, 2*c* . . . of a gate circuit 2. An oscillation controller 1*e* is provided between the circuits 1 and 2 to effect synchronization by controlling the transmission of the detection pulses so that it occurs simultaneously with the instant at which the first gate circuit becomes conductive.

The gate circuit 2 is triggered by a trigger circuit 3 comprising a trigger oscillator 3*a*, flip-flops $3b_1$, $3b_2$, $3b_3$ . . . $3b_n$, and a matrix selector circuit 3*c*, the output of which is applied to the gates 2*a*, 2*b* . . . , thereby to open successively the gates in the sequence of 2*a*, 2*b*, 2*c*. . . .

The above described components constitute the aforementioned electronic selection system. The aforementioned mechanical rotary mechanism comprises, in part, a rotary contact mechanism 4 composed of drums 4*a*, 4*b*, and 4*c* for opening and closing the power source for a counter circuit and the oscillator and drums $4d_1$, $4d_2$ . . . $4d_n$ and 4*e* for selection of gate circuits. The drums 4*a* and 4*b*, furthermore, control the opening and closing of the power source circuits respectively of the oscillator $3a_1$ and flip-flops $3b_1$, $3b_2$ . . . $3b_n$ and provided with embedded conductive contacts so as to effect breaking and making of contact with the drum 4*c* for common contact thereby to accomplish control of the application of D-C voltage.

The outputs produced successively, one at a time, from the gate circuit 2 pass through contacts $4d_1$, $4d_2$ . . . $4d_n$ embedded in successively staggered arrangement about the periphery of the drum 4*d* and through the common contact drum 4*e* and, from a recording power amplifier 5, are applied as recording voltage to a recording pen 6*a*.

In order to establish and maintain the correct time relationships, it is necessary that the above mentioned drums 4*a*, 4*b*, 4*c*, 4*d*, and 4*e* be thin circular disks which are disposed in laminate arrangement and insulated from each other and are held firmly together as an integral structure to form a single drum 4. The conductive connection of the contact parts of the drums 4*c* and 4*e* for common contact with the various drums 4*a*, 4*b*, $4d_1$, $4d_2$ . . . $4d_n$ may be established by suitably connecting conductors (not shown) buried within the drums.

The recording pen 6*a* is mounted on a disk 6*b* fixed to a drum 6 which is coupled through gears to the drum 4 so as to rotate at a rotational speed which is ¼ of that of the drum 6 (the speed ratio being, for example, 375 r.p.m.:1,500 r.p.m.). Inscriptions are made, as described hereinafter, by the recording pen 6*a* on a sheet of recording paper 7, on which there is pre-inscribed a recording scale 7*a* divided into *n* divisions from zero to maximum calibration.

During detection operation, recording of the presence or absence of detection pulses is accomplished *n* times every time the outputs of the gate circuits, from the first to the *n*th, arrive successively over the scale during the conductive times of *n* gates. In this manner, through a conductive gate coinciding with the time from the instant of transmission of a detection pulse to the instant of arrival of a received pulse, a received voltage is applied to the recording paper 7 in the position of a specific calibration. The recording pen, recording calibration, etc., can be suitably selected from those known heretofore.

In the recording mechanism, the pen 6*a* mounted on the disk 6*b* traces arcs intermittently on the recording paper 7 and registers records on the recording paper in response to the voltage application due to detection pulses.

The drum 6 comprises a conductive drum 6*c* for leading in detection pulses from the outside, a conductive drum 6*e* for conducting D-C voltage, and a control drum 6*d* having a conductive part which extends over approximately ¼ of the drum periphery and conducts D-C voltage to the drum 4*c* only through ¼ of said periphery with respect to one revolution of the conductive drum 6*e*. Since the pen, in rotating one revolution, operates during only ¼ revolution in relation to the recording paper, the above mentioned ¼ conductive part is synchronized therewith.

Referring to FIG. 2 indicating conductive states in the aforementioned trigger circuit 3, graph A indicates the operation of a binary circuit power source, that is, the state wherein a D-C voltage is passed through conductive contacts embedded at spaced intervals in the drum 4*a* and applied to flip-flop circuits $3b_1$, $3b_2$ . . . $3b_n$ (i.e., binary counter circuits) to cause the same to operate. Graph B indicates the operation of a trigger power source, that is, the state wherein a D-C voltage is passed through conductive contacts embedded at spaced intervals in the drum 4*b* and applied intermittently to the trigger oscillator 3*a*. Graph C is a set pulse representation. Graph D represents the variation with time of an output which opens a gate circuit when a trigger pulse is extracted from the matrix selector circuit 3*c* by the output of the above mentioned counter circuit.

For operational reasons, it is necessary to place the counter circuit beforehand in an operable state by advancing slightly in time the contact closure due to the drum 4*a* relative to the contact closure due to the drum 4*b*.

As described above, in the operation of the apparatus according to the present invention, signal inputs due to arriving sound waves or electromagnetic waves are applied simultaneously to all gate circuits, which are controlled by a counter circuit to open successively, thereby being passed through respectively different gate circuits depending on the time, and then passed through and selected by a rotary contact mechanism such as a rotating drum having selection contacts, the signals so selected then being applied to a single recording pen thereby to cause the pen to register the corresponding marks on the recording paper.

By pre-inscribing calibrations on the recording paper so that each calibration corresponds to one of the gate outputs, thereby pre-inscribing calibrations with very small divisions, it is possible to record very small time phenomena in detail. Moreover, with the use of only a single recording pen, the apparatus of the present invention overcomes, through electronic selection, the impossibility of the registering device to follow the operation, which has heretofore been a problem. The use of a recording pen, of course, leaves a permanent record unlike that produced on a cathode-ray tube screen In the case of an ultrasonic medical diagnostic apparatus including a recorder for recording signals up to a detection distance of 15 cm., for example, the time required for detection at 15 cm. is 200 microseconds on the assumption that velocity of propagation of sound in a human body is 1,500 meters per second. If the distance scale of *n* equal divisions is divided into 100 divisions over which the recording pen is traversed in 200 milliseconds from zero to maximum calibration, and if the sound waves are to be sent out every 2 milliseconds from the time corresponding to zero calibration, this time interval will correspond to a detection distance of 150 cm. In this case, therefore, the effect of echo sound waves of sound waves which have reciprocated a number of times or standing waves can be reduced.

The relationships between the opening times of the time gate circuits of the receiver and the traverse of the recording pen are as follows. From the zero calibration point corresponding to the instant of the first sound projection, the corresponding time gate circuit operates and opens during a period of from 0 to 2 microseconds. Then, as the recording pen traverses and 2 milliseconds have elapsed, the second sound projection occurs, from which instant a further 2 microseconds elapse, whereupon, for a period of 2 microseconds, the next time gate circuit operates and opens. Successively thereafter, the succeeding gate circuits open, each for 2 microseconds after the elapse of $(n-1)\times 2$ microseconds from the corresponding instant of sound projection ($n$th) until the last time gate opens for 2 microseconds after the elapse of $(100-1)\times 2$ microseconds after the 100th sound projection.

The electrical signals, which have been thus divided per 100 divisions into short periods of 2 microseconds in accordance with the magnitude of the received signal voltage signal are received and amplified by a recording power amplifier in a number of milliseconds in accordance with the received voltage, whereby a voltage is supplied to the recording pen to produce a recorded mark. In order to increase the accuracy of measurement, counter circuits are used.

In the aforedescribed embodiment of the invention, $n$ time-selection circuits are provided in the receiving circuit, the scale from zero to maximum calibration being divided into $n$ divisions of the specified spacing, in which the received signals are successively passed, each during a period of $\Delta t$ after the elapse of a time $(n-1)\Delta t$, and in order to record the received signals in a recording mechanism, there is provided a rotary contact mechanism whereby the $n$ time-selection circuits are caused to operate and stop in synchronism with the recording mechanism on the scale of $n$ divisions thereby to accomplish time selection of the received signal voltages and to pass, in each instance, the signal voltage through that selection circuit, out of the $n$ circuits, of coincident time, whereby the recording pen is caused to register a recording mark on the recording paper at the corresponding scale position.

In accordance with another embodiment of the invention, two ring counter circuits with respective periods which have a time duration difference of a suitable, infinitesimal time $\Delta t$ are used and caused to operate simultaneously or with a specific relative time lag G, whereby signals are transmitted or projected out at specific intervals for each of $n$ divisions, and reception is carried out successively after $(n-1)\Delta t$ or $G+(n-1)\Delta t$ from the instants of transmission.

This embodiment of the invention is based on the following principle. When the ring counters $K_1$ and $K_2$ respectively operating with periods of 2 milliseconds and (2 milliseconds+2 microseconds) are started simultaneously, time displacements, each of 2 microseconds for each period, obviously, are successively accumulated from the instant of starting. More specifically, one cycle produces a time displacement of 2 microseconds, two cycles produce a time displacement of 4 microseconds, three cycles produce a time displacement of 6 microseconds, and thereafter the time displacement increases until $n$ cycles produce a time displacement of $2n$ microseconds.

Then, when a sound wave is projected at the instant of starting of the counter $K_2$, and the receiver is operated for 2 microseconds from the instant of starting of the counter $K_2$, a receiving state is established for 2 microseconds from the instant of sound projection. After one cycle, a receiving state exists for 2 microseconds from an instant 2 microseconds after the instant of projection of the sound projection. After two cycles, a receiving state exists for 2 microseconds from an instant 4 microseconds after the instant of projection of the sound projection. After three cycles, a receiving state exists for 2 microseconds from an instant 6 microseconds after the instant of projection of the sound projection. Thereafter receiving states occur successively in a similar manner up to $n$ cycles, after which a receiving state exists for 2 microseconds from an instant $(n-1)\times 2$ microseconds after the instant of sound projection, whereby it is possible to accomplish time selection reception of $n$ divisions up to $n$ cycles.

The present invention provides means for accomplishing the above described operation by carrying out time selection detection of $n$ divisions through a detection distance of from zero to maximum calibration on the recorder scale, amplifying the signal power thus divided into infinitesimal time intervals and received to produce signal power for recording of a number of milliseconds, and supplying the signal power thus amplified to a recording pen thereby to record accurately the reflections of the projected sound waves at short distance intervals.

In the case where the known multiple projection or shift method is used, the start of the operations of the counters $K_1$ and $K_2$ is caused to occur before the zero calibration position is reached. An alternative method is to insert a delay circuit for monostability for causing the starting of the counter $K_2$ to lag by a time $t$ relative to the starting of the counter $K_1$.

Figure 3:
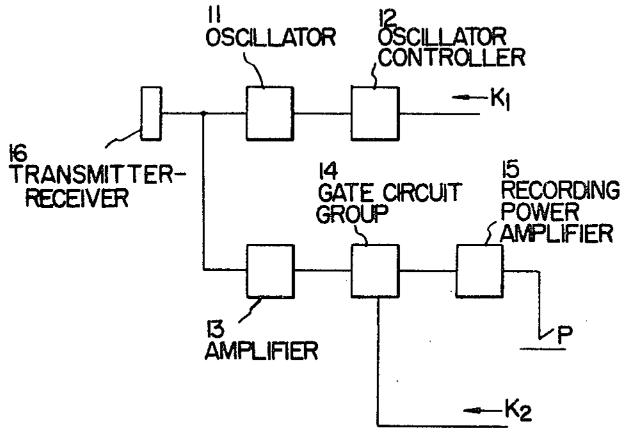
FIG. 3 is a block diagram showing the general circuit composition and arrangement of another embodiment of the invention.

Referring to FIG. 3 the block diagram shown therein generally represents a circuit for the above described embodiment of the invention in which two ring counters are used. Trigger pulses generated for each cyclic period of the counter $K_1$ trigger an oscillator controller 12 which thereby controls an oscillator 11 thereby to cause a transmitter-receiver 16 to operate.

The output of the transmitter-receiver 16 is amplified by a reception amplifier 13 and passed through a gate circuit group 14 to a recording power amplifier 15, where the received pulsive signals of the order of a number of microseconds are amplified into voltage necessary for recording and supplied to a recording pen P. The gate circuit group 14 is opened by output gate pulses each of $\Delta t$ duration. The output gate pulses are obtained by operation of a monostable multivibrator, and operation is caused by trigger pulses generated per cyclic period of the counter $K_2$.

Alternatively, instead of using a monostable multivibrator, gate pulses which are the outputs of a time selection circuit and are generated per cyclic period of the counter $K_2$ (that is, in the example illustrated in FIG. 4, the output gate pulses of the AND circuits operated by the first terminal power respectively of matrix circuits $m_1$ and $m'_1$) may be supplied to the gate circuits of the receiver.

Figure 4:
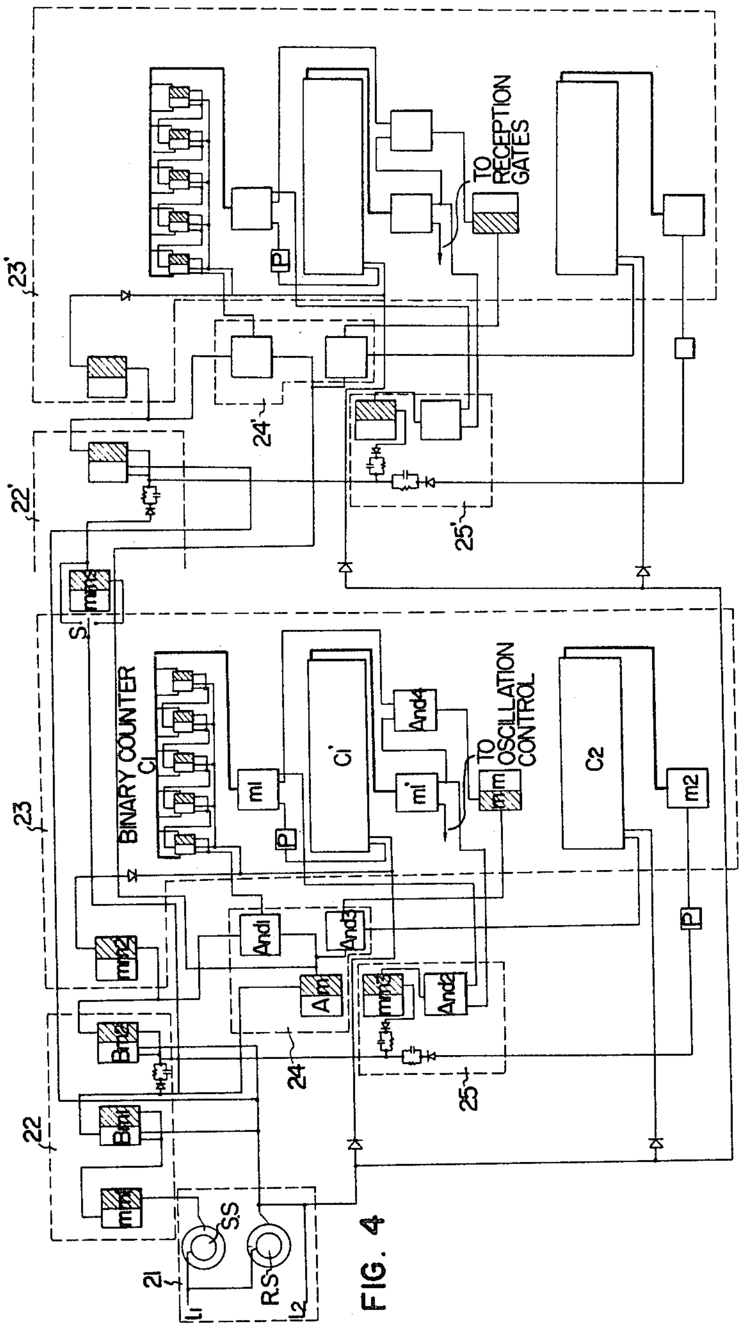
FIG. 4 is a circuit diagram, partly in block form, showing a specific example of a circuit corresponding to the diagram shown in FIG. 3.
Figure 5:
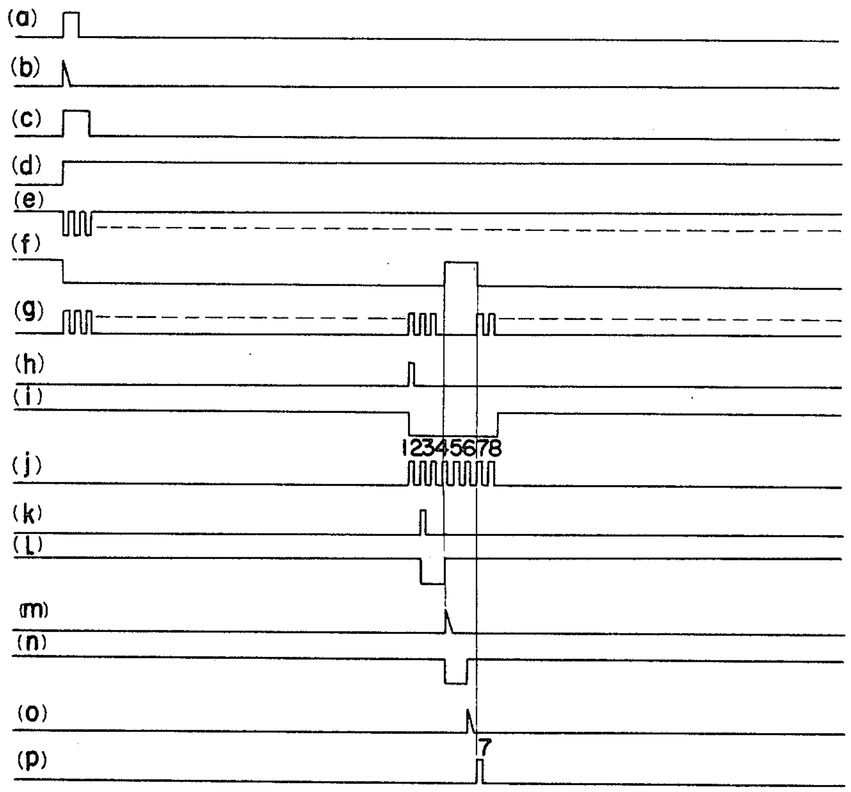
FIGS. 5 and 6 are graphical time charts indicating the operations of various parts of the circuit shown in FIG. 4.
Figure 6:
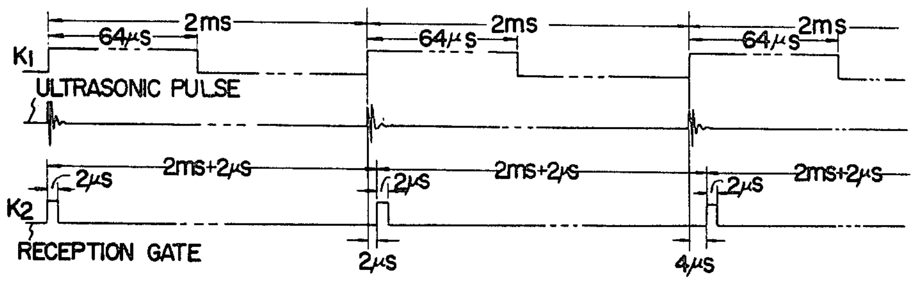

In order to indicate more fully the nature and details of the invention, the following specific example of embodiment thereof is presented, reference being had to FIGS. 4, 5, and 6. Since the operations of the two ring counters $K_1$ and $K_2$ are identical, the following description is set forth with respect to the counter $K_1$.

Referring to FIG. 4, a section 21 of the apparatus shown therein contains rotary switches SS and RS adapted to rotate in synchronism with the traverse of a recording pen and to send pulses for starting and stopping the counters (the switches SS and RS make contact at zero calibration and maximum calibration positions, respectively). These rotary switches SS and RS are respectively connected to a monostable multivibrator and a bistable multivibrator 22 which are operated by trigger pulses generated in the section 21 including the rotary switches SS and RS.

The circuit 22 is connected to a ring counter circuit 23 comprising binary counters, matrix groups, etc. The counter circuit 23 is supplied with trigger pulses by a circuit 24 comprising a free-running or astable multivibrator and AND circuits. Furthermore, there is provided a circuit 25 comprising a monostable multivibrator and an AND circuit for supplying trigger pulses for causing the counter circuit 23 to undergo periodically cyclic operation. In FIG. 4, the numerals 22', 23', 24' and 25" correspond respectively to the members 22, 23, 24 and 25.

The operation of the ring counter will now be considered in conjunction with the waveform diagrams shown on the time chart of FIG. 5. The apparatus is so set that the recording pen traversing at constant speed over the surface of a recording paper moving at a constant speed causes the rotary switches 21 to make contact at the zero calibration position, whereupon a rectangular pulse (*a*) is produced. This rectangular pulse is converted into a trigger pulse (*b*) by a differentation circuit contained in the monostable multivibrator $mm_1$ of the circuit 22, whereby a rectangular pulse ($c$) leaves the monostable multivibrator $mm_1$, enters the bistable multivibrator $Bm_1$, and passing through a differentiation circuit contained in this bistabtle multivibrator $Bm_1$, causes inversion.

Simultaneously with this inversion, a voltage of the waveform ($d$) is produced from the bistable multivibrator $Bm_1$, which voltage causes the free-running multivibrator $Am$ of the circuit 4 to operate and produce an output of waveform ($e$) which is applied to the AND circuit $And_1$. When the first-stage bistable multivibrator $Bm_1$ is inverted, the second-stage bistable multivibrator $Bm_2$ is also inverted, and a voltage of waveform ($f$) is applied to the AND circuit $And_2$. From the AND circuit $And_1$, an output of waveform ($g$) passes through a differentiation circuit of the binary counter $C_1$ and is differentiated. The counter circuit 23 is caused to operate by the trigger pulse P occurring per cyclic period of the oscillation frequency of the free-running multivibrator $Am$, whereby voltage shifts at time intervals equal to the pitch of the trigger pulse from the first to the $n$th output of the matrix circuit $m_1$.

The first terminal is connected to the second-stage binary counter to send a trigger pulse for each cycle of the first-stage binary counter and thereby to cause operation thereof, whereby successive shifts are caused for each cycle of the output of the first-stage matrix circuit $m_1$ from the first to the $m$th output terminal of the second-stage matrix circuit $m'_1$.

When, for example, the third output of the first-stage matrix circuit $m_1$ and the 32nd output of the second-stage matrix circuit $m'_1$ coincide, the output of the AND circuit $And_2$ producing an output causes a pulse of the circuit 24 to be sent when 995 trigger pulses have entered, whereupon the monostable multivibrator $mm_1$ operates to send a rectangular voltage ($i$) to the AND circuit $And_2$. Only during the time when this voltage coincides with the output of the free-running multivibrator $Am$, the oscillation output ($j$) of the free-running multivibrator $Am$ passes through a differentiation circuit of the third-stage binary counter and is sent in as a trigger pulse, and, in the third-stage matrix circuit $m_2$, an output voltage variation is shifted and produced from the first to the eighth each time a trigger pulse enters from an output terminal.

The output of the AND circuit $And_4$ which operates when the outputs of the 4th output terminal of the first-stage matrix $m_1$ and the 32nd output terminal of the second-stage matrix $m'_1$ coincide sends out a pulse ($k$) when 996 trigger pulses have entered, and the monostable multivibrator $mm_3$ operates as indicated by waveform ($l$). At the time when this operation stops, a voltage pulse of waveform ($m$) is sent into the bistable multivibrator $Bm_2$ of the succeeding stage, which is thereupon inverted, and the output voltage disappears as indicated by waveform ($f$). The output of the AND circuit $And_1$ thereby disappears, and the first-stage and second-stage binary counters stop as indicated by waveform ($g$).

Simultaneously, the monostable multivibrator $mm_2$ produces an output of waveform ($n$), and when this output stops, a reset pulse of waveform ($o$) is applied to the first-stage and second-stage counter circuits, which are thereby set.

An output ($p$) of waveform voltage of the 7th output terminal of the third-stage matrix circuit $m_2$ causes a trigger pulse to be sent to the bistable multivibrator $Bm_2$ of the succeeding stage to invert the bistable multivibrator $Bm_2$, which is thereby restored to its initial state.

That is, when the pitch of trigger pulses which are caused to undergo one cycle by 1,000 output trigger pulses of the free-running multivibrator $Am$ is 2 microseconds, one cyclic period becomes 2 milliseconds. The counter $K_2$ is caused to undergo one cycle by 1,001 output trigger pulses of the free-running multivibrator $Am$, and one cyclic period is 2 milliseconds+2 microseconds. Reference notation $mms$ designates a distance-shift monostable multivibrator.

What we claim is:

1. A high-speed recording method which comprises: causing two ring counter circuits to operate simultaneously with respective cyclic periods which differ by a suitable very small time $\Delta t$; projecting a sound wave at the start of each period of the counter circuit of shorter cyclic period; opening a time gate of a receiver for intercepting the sound wave for a time equal to $\Delta t$ from the start of the period of the counter circuit which completes its cycle with a delay; and successively carrying out reception $n$ times through $n$ cycles, each for $\Delta t$ after a lag time of $(n-1)\Delta t$ from the instant of the respective projection of the sound wave thereby to accomplish time selection reception of $n$ divisions.

References Cited

UNITED STATES PATENTS 2,955,284 10/1960 Thorsen ----------- 346—33 X

RICHARD B. WILKINSON, *Primary Examiner.*

JOSEPH W. HARTARY, *Assistant Examiner.*